United States Patent [19]

Hugelshofer

[11] 3,989,452

[45] Nov. 2, 1976

[54] STABLE, CONCENTRATED SOLUTIONS OF COMPLEX METAL COMPOUNDS OF AZO DYESTUFFS

[75] Inventor: Paul Hugelshofer, Muttenz, Switzerland

[73] Assignee: Ciba-Geigy Corporation, Ardsley, N.Y.

[22] Filed: Feb. 21, 1975

[21] Appl. No.: 551,872

Related U.S. Application Data

[63] Continuation-in-part of Ser. No. 298,171, Oct. 16, 1972, which is a continuation of Ser. No. 54,610, July 13, 1970, abandoned.

[52] U.S. Cl. .................................. 8/42 R; 8/93; 8/172 R; 8/173
[51] Int. Cl.² .................... C09B 45/00; D06P 1/10
[58] Field of Search ................... 8/42, 93, 172, 173

[56] References Cited

UNITED STATES PATENTS

| | | | |
|---|---|---|---|
| 2,828,180 | 3/1958 | Sertorio | 8/62 |
| 3,086,831 | 4/1963 | Robbins | 8/42 |
| 3,129,053 | 4/1964 | Castle | 8/93 |
| 3,265,461 | 8/1966 | Luetzel | 8/84 |
| 3,346,322 | 10/1967 | Finkenauer | 8/79 |
| 3,451,762 | 6/1969 | Hendricks et al. | 8/39 |
| 3,623,834 | 11/1971 | Seuret et al. | 8/172 |
| 3,644,080 | 2/1972 | McCullough | 8/4 |
| 3,704,086 | 11/1972 | Bayew et al. | 8/42 |

FOREIGN PATENTS OR APPLICATIONS

| | | |
|---|---|---|
| 1,342,032 | 9/1963 | France |
| 1,277,880 | 10/1961 | France |
| 1,112,032 | 5/1968 | United Kingdom |
| 1,060,063 | 2/1967 | United Kingdom |
| 982,735 | 2/1965 | United Kingdom |
| 913,646 | 12/1962 | United Kingdom |

OTHER PUBLICATIONS

Colour Index, 3rd Edition, vol. 4, pp. 4057, 4072, 4084, 4095, (Lund Humphries, 1971).

*Primary Examiner*—Joseph L. Schofer
*Assistant Examiner*—A. L. Clingman
*Attorney, Agent, or Firm*—Joseph G. Kolodny; Edward McC. Roberts; Prabodh I. Almaula

[57] ABSTRACT

Stable concentrated solutions of sulfogroup-containing azo-dyestuff-metal complexes in water-miscible organic solvents.

25 Claims, No Drawings

STABLE, CONCENTRATED SOLUTIONS OF COMPLEX METAL COMPOUNDS OF AZO DYESTUFFS

The present application is a continuation-in-part of pending application Ser. No. 298,171, filed Oct. 16, 1972, which is in turn a continuation application of Ser. No. 54,610, filed July 13, 1970, now abandoned.

The use of dyestuffs in the form of concentrated stock solutions is known. This enables certain disadvantages which occur when the dyestuffs are used as finely ground powders to be overcome, for example formation of dust, solution difficulties and foaming. Furthermore, the dyestuffs in liquid form have under certain circumstances a lower transport volume and are easier to calibrate. References to concentrated stock solutions of 2:1-metal complexes of azo dyestuffs free from sulphonic acid groups and of dyestuff salts of azo dyestuffs free from metal and containing sulphonic acid groups with aliphatic diamines and alkanolamines stable towards heat and frost have already appeared in the literature.

The present invention is based on the unexpected observation that stable concentrated solution can also be prepared from metal complexes of azo dyestuffs that contain sulphonic acid groups by using a solvent medium mixture comprising principally water-soluble polyhydric alcohols that are liquid at room temperature, or their ethers or water-soluble polyethers, low-molecular aliphatic carboxylic acids and their amides. Examples of such compounds are: ethylene glycol, propylene glycol, di- and triethylene glycol, 2-methyl-pentanediol-2,4, ethylene glycol monomethyl, monoethyl or monobutyl ether, diethylene glycol monomethyl, monoethyl or monobutyl ether, diethylene glycol monoethyl ether acetate, triethylene glycol monobutyl ether, dipropylene glycol, glycerine glycerine-1,3-diethyl ether, thiodiglycol, formamide, N,N-dimethylformamide, N,N-dimethylacetamide, N,N-dimethylmethoxyacetamide and N,N,N',N'-tetramethylurea. Further suitable solvents are lactams, lactones, or nitriles which may contain hydroxyl groups, for example N-methylpyrrolidone, 1,5-dimethylpyrrolidone, γ-butyrolactone, acetonitrile or β-hydroxypropionitrile, and other liquid compounds for example esters, for example ethyl lactate, ethylene carbonate, diethylene glycol monoacetate, ethyloxybutyrate; ketones and hydroxyketones, for example methyl ethyl ketone, diacetone alcohol or acetonylacetone; monoalcohols which may optionally contain ether groups, for example isopropanol, 2-hydroxymethyltetrahydropyran, tetrahydrofurfuryl alcohol, glycerineformal (5-oxy-1,3-dioxane); sulphur compounds, for example sulpholan (tetramethylenesulphone, tetrahydrothiophene-s-dioxide) and sulpholene (2,3-or 2,5-dihydrothiophene-S-dioxide) and their derivatives substituted in α and/or β position particularly by alkyl or hydroxyalkyl group, and dimethyl sulphoxide; phosphorus compounds, for example hexamethylphosphoric acid triamide, bis-(dimethylamido)-methane phosphate and dimethyl methylphosphonate; simple heterocyclic compounds for example tetrahydrofuran, pyridine, dioxane, glycolformal (1,3-dioxolan).

Preferred solvents for the concentrated solutions according to the present invention are selected from mono or polyalkylene glycols or thioglycols or ethers thereof, dihydric or trihydric low molecular weight alcohols or thioalcohols which are hydrocarbon except for the oxy or thio linkages, ketones, such as diacetone alcohol, cyclic ethers such as tetrahydrofuran, dioxane, glycolformal and in particular tetrahydrofurfuryl alcohol, lactams, lactones such as butyrolactone, dimethyl sulfoxide, sulfolan, sulfolene, hexamethylphosphoric acid triamide, dimethyl methylphosphonate, N-methylpyrrolidone, and low molecular aliphatic carboxylic acid amides such as N,N-dimethylacetamide and N,N-dimethylformamide.

Particularly advantageous are solvent mixtures selected from mono alkylene glycols, e.g. ethylene glycol and 1,2-propylene glycol; poly alkylene glycols, e.g. diethylene glycol, triethylene glycol and 2-methylpentanediol-2,4; thioglycols, e.g. thiodiglycol; and ethers thereof, e.g. ethyl cellosolve, diethylene glycol monoethyl ether, diethylene glycol monobutyl ether, a low molecular aliphatic carboxylic acid amide, e.g. N,N-dimethylformamide and N,N-dimethylacetamide, a cyclic ether, e.g. tetrahydrofurfuryl alcohol, dimethyl sulfoxide, butyrolactone, sulfolan, hexamethylphosphoric acid triamide, N-methyl-pyrrolidone and/or diacetone alcohol. Preferred concentrated solutions according to the present invention comprise one or more polyhydric alcohol selected from mono alkylene glycols, poly alkylene glycols, thioglycols, and ethers thereof in admixture with tetrahydrofurfuryl alcohol and/or diacetone alcohol.

In the process of the present invention the metal complexes of azo dyestuffs containing sulphonic acid groups are used in the form of their metal salts, for example the sodium, potassium or magnesium salts.

Suitable complex azo dyestuffs are, for example, 1:1-nickel or especially 1:1-copper or 1:1-chromium complexes, as well as 1:2-cobalt or especially 1:2-chromium complexes, preferably those of monoazo dyestuffs but also those of naphthaleneazonaphthalene, and polyazo dyestuffs; in these 1:2- complexes the two azo dyestuff residues may be identical or different. In at least one and preferably in only one azo dyestuff molecule, at least one and preferably only one sulphonic acid group must be present. Especially valuable are ortho-carboxy-ortho'-hydroxyazo and especially ortho, ortho'-dihydroxyazo dyestuffs of the naphthaleneazonaphthalene, benzeneazonaphthalene, benzeneazoquinizine or benzeneazoaceto acetic acid amide series, which may be substituted, preferably by nitro groups or halogen atoms. Such dyestuffs have been described, for example, in French Specifications Nos. 1,203,570; 1,220,587; 1,232,916 and 75,566; 1,246,903; 1,269,496; 1,269,497; 1,272,728; 1,272,729; 1,273,542, 1,442,837 and especially in French Specifications Nos. 1,101,955; 1,102,028; 1,352,623; 1,370,510; 1,371,123; 1,376,128 and 1,414,067. The dyestuffs may also be used in the form of mixtures with one an other and, if desired, with dyestuffs of a different type, for example with non-metallisable azo dyestuffs. However, relatively heavy metal complexes are of special value, that is to say those which in the form of their free acids have a molecular weight of at least 430 without the metal atom bound in complex union, particularly 1:1-copper complexes or especially 1:1-chromium complexes of azo dyestuffs of the naphthaleneazonaphthalene series or 1:2-cobalt or especially 1:2-chromium mixed complexes of azo dyestuffs of the types mentioned above, as well as metal complexes of azo or azomethine dyestuffs in which one of the two dyestuff residues in the molecule is a disazo or azomethine dyestuff.

The dyestuff preparations according to the present invention may, in addition to the metal complex dyestuffs defined above, also contain in admixture therewith, azo and azomethine dyestuffs with or without sulfonic acid groups.

The compounds used may be mixed at room temperature or at an elevated temperature. If desired, a small quantity of a nonionic, anionic or kationic tenside may be added. The dyestuff solutions of this invention may if desired, also contain water, advantageously however no more than 10 to 20%, preferably not more than 10%, without losing their good storage properties. Furthermore, substances that prevent moulding may be added, as well as anti-foaming agents. In many cases an addition of solid compounds, for example caprolactam, trimethylolethane, lactic acid amide or of a small proportion of urea, thiourea, tetrahydroxymethylmethane (pentaerythritol) or the like has a favourable effect upon the behaviour of the solution of the dyestuffs, for example to improve solubility and/or to prevent undesirable crystallisation. Dispersants that are soluble in the solvents or solvent mixtures used may also be incorporated with the solutions. On the other hand, the preparations according to this invention must be free from thickeners. The quantities used are advantageously selected so that the solutions according to this invention contain the dyestuffs in a high concentration, for example from 10 to 60 or 10 to 40% by weight. As a rule, however, the amount of dyestuff is at least 15 or preferably at least 20% by weight.

In spite of their high content of dyestuffs these solutions have the character of true or colloidal solutions; even when a certain degree of oversaturation has occurred they remain liquid at temperatures below 0° C. The dyestuffs do not decompose or crystallise even when the solutions are stored for a long time.

This is certainly unexpected since it could not have been forseen that notwithstanding the presence of strongly hydrophilic sulphonic acid groups the dyestuff metal complexes would form concentrated and stable solutions in organic media, and that in the solutions obtained the dyestuff would be present in the form of a true or colloidal solution. The resulting concentrated solutions remain unchanged even after long storing and without addition of agents that prevent sedimentation, for example compounds that produce thixotropy, that is to say they do not develop the swelling and/or sedimentation often associated with dispersions. It is also an advantage in the manufacture of the preparations that a preliminary removal of the salt content of the dyestuffs used can be dispensed with since this at most only partially dissolves and is easy to remove by a subsequent clarifying filtration or centrifuging. The temperature required for dissolving the dyestuff and the time depend on the dyestuff and on the solvent or solvent mixture used; these data are easy to determine by preliminary experiments.

The solutions according to this invention are miscible with water in all proportions or also in part with suitable organic solvents and they are easy to measure volumetrically. The introduction of the dyestuff solutions according to the invention into the dyebath can be carried out even at room temperature without risk of the formation of lumps. With pulverulent dyestuff preparations on the other hand it is often necessary before adding the dyestuff solution to the dyebath to prepare an aqueous stock solution at an elevated temperature to ensure that the dyestuff dissolves or disperses completely in the dyebath.

The concentrated solutions according to this invention are specially suitable for the manufacture of dyestuff solutions for dyeing paper and particularly textile fibres, especially nitrogenous fibres, for example synthetic polyamide fibres, by the conventional dyeing methods for acid dyestuffs, but they may also be used for other purposes, for example for the manufacture of inks or printing inks for posters, stamp pads, typewriter ribbons and the like.

Unless otherwise indicated parts and percentages in the following Examples are by weight.

EXAMPLE 1

54 Parts of the brown chromium complex azo dyestuff C.I. Acid Brown 282 are introduced at room temperature into a mixture of 20 parts of dimethylformamide and 126 parts of diethylene glycol and the mixture is stirred for 5 hours at room temperature. To remove any undissolved salts the solution is centrifuged; it contains about 21% of dyestuff. After a long storage period even at a temperature of −15° C the dyestuff does not crystallise. When this rather thinly liquid solution is poured into water, a homogeneous distribution takes place within a few seconds. A stable concentrated solution is obtained having similar properties when the above dyestuff is replaced by the brown 1:2-chromium complex dyestuff from

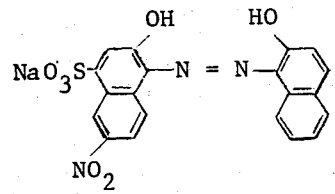

and

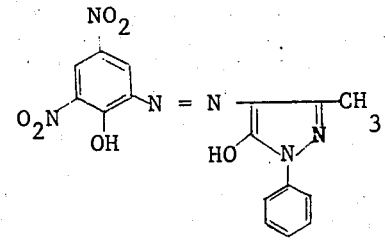

described in French Pat. No. 1,352,623, Example 1.

EXAMPLE 2

A solution having the properties described in Example 1 is obtained when 54 parts of C.I. Acid Brown 282 are added to a mixture of 20 parts of dimethylformamide, 40 parts of diacetone alcohol and 86 parts of diethylene glycol.

EXAMPLE 3

A dyestuff solution having similar properties is obtained by adding 54 parts of C.I. Acid Brown 282 to a mixture of 40 parts of diacetone alcohol, 20 parts of dimethylformamide and 80 parts of ethylene glycol.

Before adding the dyestuff to the solvent mixture, 6 parts of urea are dissolved therein. The dyestuff is introduced into the solution at room temperature and the mixture is stirred for 5 hours. Any undissolved salts are removed by centrifuging.

EXAMPLE 4

66 Parts of the red-brown chromium complex dyestuff C.I. Acid Brown 283 are stirred at 50° to 60° C into a mixture of 50 parts of dimethylformamide, 20 parts of diacetone alcohol, 16 parts of diethylene glycol monoethyl ether and 48 parts of diethylene glycol. The mixture is stirred for 2 hours at 50° to 60° C, the heating bath is removed and the batch is stirred for another 3 hours at room temperature. Any undissolved salts are removed on a centrifuge. Yield: 176 parts of a stable solution which after prolonged storage even at a room temperature of −10° C does not crystallise.

A stable concentrated solution having similar properties is obtained when the above dyestuff is replaced by the black 1:2 chromium complex dyestuff from

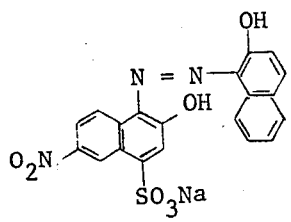

and

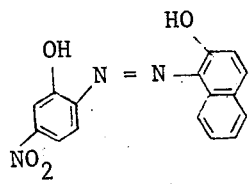

described in French Pat. No. 1,101,955, Example 1.

EXAMPLE 5

A very stable solution is obtained by adding 74 parts of the dyestuff C.I. Acid Blue 229 to a mixture of 20 parts of dimethylformamide, 40 parts of diacetone alcohol and 66 parts of diethylene glycol at 50° to 60° C. When all the dyestuff has been added, the mixture is heated for 2 hours at 50° to 60° C, the heating bath is removed and the batch stirred for another 3 hours without heating. Any undissolved salts are removed by centrifuge.

A stable concentrated solution is obtained having similar propertied when the above dyestuff is replaced by the gray 1:2 chromium complex dyestuff from

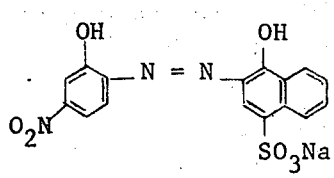

and

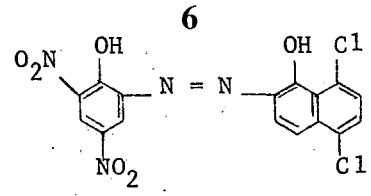

described in French Pat. No. 1,370,510, Example 7 of the table on page 5.

EXAMPLE 6

60 Parts of the dyestuff C.I. Acid Black 52 (C.I. 15711) are added at 50° to 60° C to a mixture of 30 parts of dimethylformamide, 20 parts of diacetone alcohol and 90 parts of diethylene glycol. The mixture is heated for 2 hours at 50° to 60° C, the heating is then removed and the mixture is stirred for another 3 hours. After having removed any undissolved matter, a stable solution of the dyestuff is obtained.

EXAMPLE 7

33 Parts of C.I. Acid Brown 283 are added at 50° to 60° C with stirring to a mixture of 25 parts of dimethylformamide, 10 parts of hexamethylphosphoric acid triamide, 8 parts of diethylene glycol monoethyl ether and 24 parts of diethylene glycol. The mixture is stirred for 2 hours at 50° to 60° C. The heating is then removed and the batch stirred for another 3 hours. The solution formed is freed from undissolved matter by centrifuge, and 89 parts of a stable solution are obtained.

A stable concentrated solution is obtained having similar properties when the above dyestuff is replaced by the red 1:2-chromium complex dyestuff from

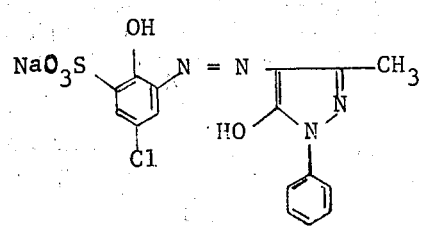

and

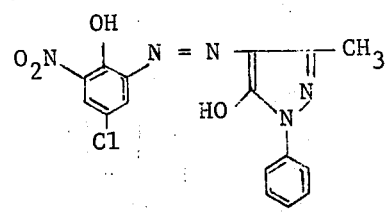

described in French Pat. No. 1,101,955, Example 4.

EXAMPLE 8

A solution having similar properties is obtained when 33 parts of the dyestuff C.I. Acid Brown 283 added to a mixture of 25 parts of dimethylformamide, 10 parts of diacetone alcohol, 10 parts of hexamethylphosphoric acid triamide and 22 parts of diethylene glycol.

A stable concentrated solution having similar properties is obtained when the above dyestuff is replaced by the green 1:2 chromium complex dyestuff from

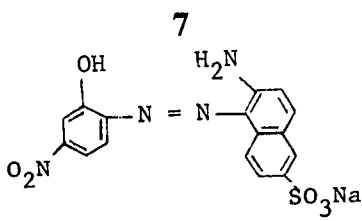

and

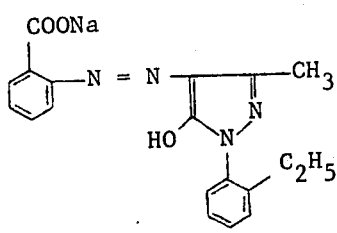

described in French Pat. No. 1,101,955, Example 14 of the table on page 5.

EXAMPLE 9

35 Parts of the dyestuff C.I. Acid Red 315 are stirred at 50° to 60° C. into a mixture of 20 parts of dimethylformamide, 10 arts of diacetone alcohol, 10 parts of hexamethylphosphoric acid triamide and 25 parts of diethylene glycol. The mixture is stirred for 2 hours at this temperature. The heating is then removed and the mixture stirred for another 3 hours. To remove any undissolved matter the solution is centrifuged: 85 parts of a stable solution are obtained.

A stable solution having similar properties is obtained when the above dyestuff is replaced by the orange 1:2 chromium complex dyestuff from

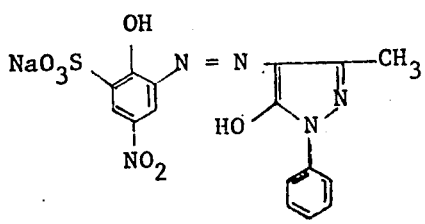

and

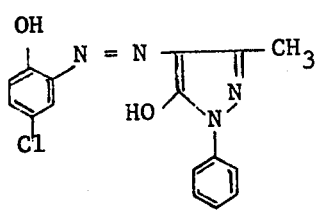

described in French Pat. No. 1,371,123, Example 3 of the table on page 3.

EXAMPLE 10

37 Parts of the dyestuff C.I. Acid Blue 229 are added at 50° to 60° C to a solvent mixture consisting of 10 parts of dimethylformamide, 20 parts of diacetone alcohol, 16 parts of thiodiglycol and 17 parts of diethylene glycol. The mixture is stirred for 2 hours at 50° to 60° C. The heating is then switched off and the whole stirred for another 3 hours. Any undissolved matter is removed from the solution on a centrifuge. A yield of 89 parts of a solution is obtained which is stable even after prolonged storage at −10° C.

EXAMPLE 11

A solution having properties very similar to those described in Example 10 is obtained by adding 37 parts of the dyestuff C.I. Acid Blue 229 to a mixture of 10 parts of dimethylformamide, 20 parts of diacetone alcohol, 10 parts of N-methylpyrrolidone and 23 parts of diethylene glycol.

A stable concentrated solution is obtained having similar properties when the above dyestuff is replaced by the blue 1:2-chromium complex dyestuff from

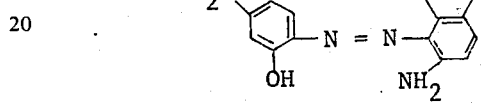

and

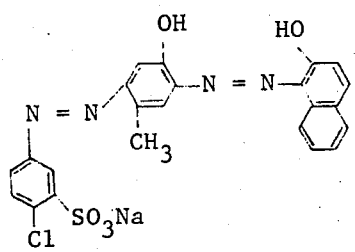

described in French Pat. No. 1,232,916, Example 9.

EXAMPLE 12

A stable solution of the dyestuff C.I. Acid Blue 229 can also be prepared by slowly adding 37 parts of this dyestuff to a mixture of 10 parts of dimethylformamide, 20 parts of diacetone alcohol and 33 parts of 2-methylpentanediol-2,4.

EXAMPLE 13

35 Parts of the dyestuff C.I. Acid Green 73 are stirred at 50° to 60° C into a mixture of 25 parts of dimethylformamide, 20 parts of diacetone alcohol, 10 parts of hexamethylphosphoric acid triamide and 10 parts of diethylene glycol. The whole is stirred for 2 hours at 50° to 60° C. The heating is then switched off and stirring continued for 3 hours. To free it from any undissolved matter the mixture is centrifuged. The yield is 81 parts of a stable solution.

A stable solution having similar properties is obtained when the above dyestuff is replaced by the 1:2-chromium complex dyestuff from

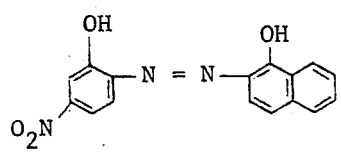

and

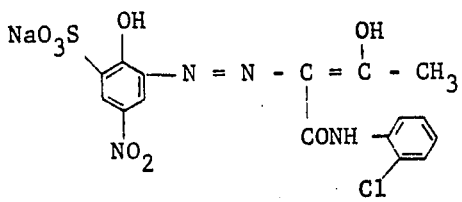

described in French Pat. No. 1,376,138, Example 4 of the table on page 4.

EXAMPLE 14

30 Parts of the dyestuff C.I. Acid Black 52 are added at 50° to 60° C with thorough stirring to a mixture of 15 parts of dimethylformamide, 10 parts of diacetone alcohol, 10 parts of sulpholan and 35 parts of diethylene glycol. The mixture is stirred for 2 hours at 50° – 60° C., the heating is then switched off and stirring continued for 3 hours. The mixture is centrifuged and 82 parts of a rather viscous solution are obtained which does not crystallise even after prolonged storage.

EXAMPLE 15

A solution of C.I. Acid Black 52 having similar properties is obtained when a solvent mixture consisting of 15 parts of dimethylformamide, 10 parts of diacetone alcohol, 10 parts of dimethylsulphoxide and 35 parts of diethylene glycol is used instead of the solvent mixture mentioned in Example 14.

EXAMPLE 16

A stable solution of C.I. Acid Black 52 is also obtained according to Example 15 by using a solvent mixture consisting of 15 parts of dimethylformamide, 10 parts of diacetone alcohol, 22.5 parts of diethylene glycol monobutyl ether and 22.5 parts of diethylene glycol.

EXAMPLE 17

27 Parts of the dyestuff C.I. Acid Brown 282 are added at room temperature to a mixture of 10 parts of dimethylformamide, 10 parts of butyrolactone, 10 parts of diacetone alcohol and 43 parts of diethylene glycol, and the mixture is stirred for 5 hours at room temperature. To remove any undissolved matter the batch is centrifuged and 89 parts of a stable, homogeneous solution are obtained.

EXAMPLE 18

When in the process described in Example 17 a mixture of 10 parts of dimethylformamide, 20 parts of diacetone alcohol and 43 parts of triethylene glycol is used, a stable solution of C.I. Acid Brown 282 is also obtained.

EXAMPLE 19

30 Parts of the dyestuff C.I. Acid Green 73 are stirred at 50° to 60° C into a mixture of 20 parts of dimethylformamide, 20 parts of diacetone alcohol, 12 parts of diethylene glycol monoethyl ether and 18 parts of diethylene glycol. The mixture is stirred for 2 hours at 50° – 60° C, the heating is then switched off and stirring continued for 3 hours. To free it from any undissolved matter the mixture is centrifuged, and 83 parts of a very stable solution are obtained.

EXAMPLE 20

42 Parts of the dyestuff C.I. Acid Red 315 are stirred at 50° to 60° C into a mixture of 30 parts of dimethylformamide, 10 parts of hexamethylphosphoric acid triamide and 18 parts of diethylene glycol. The mixture is stirred for 2 hours at 50° to 60° C. The heating is switched off and the mixture stirred for another 3 hours. Any undissolved matter is removed by centrifuging, and 83 parts of a very stable solution of the dyestuff are obtained.

A stable concentrated solution is obtained having similar properties when the above dyestuff is replaced by the red 1:2-chromium complex dyestuff from

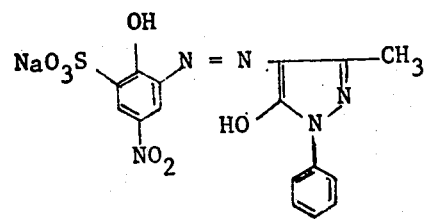

and

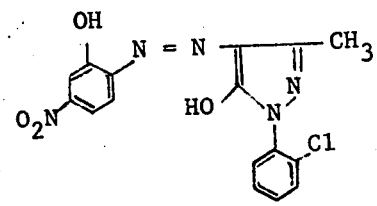

described in French Pat. No. 1,371,123, Example 5 of the table on page 3.

EXAMPLE 21

44.4 Parts of the dyestuff C.I. Acid Blue 229 are stirred at 50° to 60° C into a mixture of 8.9 parts of dimethylformamide, 17.6 parts of diacetone alcohol and 29.1 parts of diethylene glycol. The mixture is stirred for 2 hours at this temperature, the heating is then switched off and stirring continued for 3 hours. To remove any undissolved matter the mixture is centrifuged to yield 87 parts of a very stable solution of the dyestuff.

EXAMPLE 22

50 Parts of the dyestuff C.I. Acid Brown 298 are added at 50° to 60° C to a solvent mixture consisting of 22 parts of diethylene glycol, 18 parts of diacetone alcohol and 10 parts of dimethylformamide. The mixture is well stirred for 2 hours at 50° to 60° C. After this period the heating is switched off and stirring continued for 3 hours. Any undissolved matter is removed on a centrifuge and 68 parts of a stable solution are obtained.

A stable concentrated solution is obtained having similar properties when the above dyestuff is replaced by the violet 1:2 cobalt complex dyestuff from

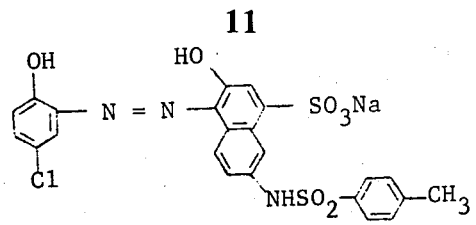

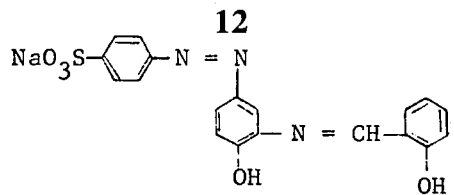

and

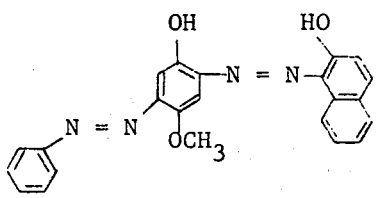

described in French Pat. No. 1,203,570, Example 1.

EXAMPLE 23

50 Parts of the dyestuff C.I. Acid Blue 259 are added at 50° to 60°C while stirring well to a mixture of 15 parts of diethylene glycol, 10 parts of diethylene glycol monoethyl ether, 5 parts of dimethylacetamide and 20 parts of dimethylformamide. The mixture is stirred for 2 hours at 50° – 60° C. the heating is then switched off and stirring continued for 3 hours. To remove any undissolved matter the batch is centrifuged, and 46 parts of a stable solution of the dyestuff are obtained.

A stable concentrated solution is obtained having similar properties when the above dyestuff is replaced by the green 1:2-chromium complex dyestuff from

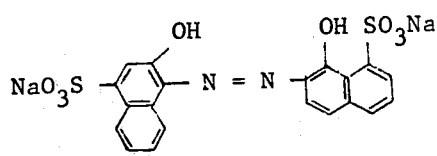

and

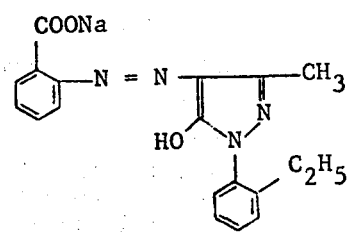

described in French Pat. No. 1,220,587, Example 1 of the table on page 5.

EXAMPLE 24

50 Parts of the dyestuff C.I. Acid Green 87 are stirred at 50° to 60° C into a mixture of 10 parts of diethylene glycol, 10 parts of diethylene glycol monoethyl ether, 10 parts of diacetone alcohol and 20 parts of dimethylformamide. The mixture is heated for 2 hours at 50° – 60° C, the heating is then removed and stirring continued for 3 hours. After having separated any undissolved matter 67 parts of a stable solution of the dyestuff are obtained.

A stable concentrated solution is obtained having similar properties when the above dyestuff is replaced by the green 1:2-chromium complex dyestuff from

EXAMPLE 25

45 Parts of the dyestuff C.I. Acid Red 339 are stirred at 50° to 60° C into a mixture of 10 parts of diethylene glycol, 10 parts of diethylene glycol monoethyl ether, 5 parts of dimethylacetamide and 30 parts of dimethylformamide. On completion of the dyestuff addition the mixture is stirred for 2 hours at 50° to 60° C, the heating bath is then removed and stirring continued for 3 hours without heating. Any undissolved matter is removed on a centrifuge, and 75 parts of a stable solution of the dyestuff are obtained.

A stable concentrated solution is obtained having similar properties when the above dyestuff is replaced by the red 1:2-chromium complex dyestuff from

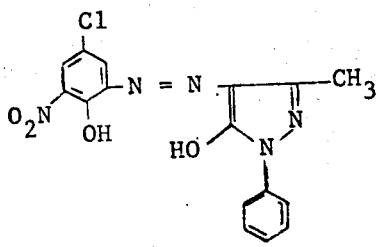

and

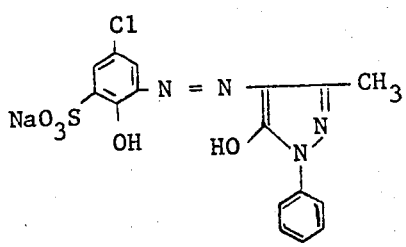

described in French Pat. No. 1,102,028, Example 12 of the table on page 6.

EXAMPLE 26

66 Parts of the red-brown dyestuff C.I. Acid Brown 283 are stirred at 50° to 60° C into a mixture of 50 parts of dimethylformamide, 20 parts of dimethylacetamide, 16 parts of diethylene glycol monoethyl ether and 48 parts of diethylene glycol. The whole is stirred for 2 hours at 50° to 60° C. The heating bath is then removed and stirring continued for 3 hours. After having removed any undissolved matter on a centrifuge, 177 parts of a stable solution of the dyestuff are obtained.

A stable concentrated solution having similar properties is obtained when the above dyestuff is replaced by the bluish red 1:2-chromium complex dyestuff from

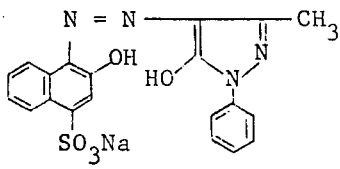

and

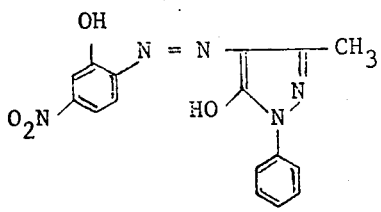

described in French Pat. No. 1,101,955, Example 3.

EXAMPLE 27

A solution having good properties similar to those mentioned in Example 26 is obtained by adding 66 parts of the dyestuff C.I. Acid Brown 283 to a mixture of 50 parts of dimethylformamide, 10 parts of dimethylacetamide, 10 parts of hexamethylphosphoric acid triamide and 64 parts of diethylene glycol by the method described in Example 26.

EXAMPLE 28

When 84 parts of the dyestuff C.I. Acid Red 315 are added according to Example 26 to a solvent mixture of 60 parts of dimethylformamide, 10 parts of dimethylacetamide, 20 parts of diethylene glycol monoethyl ether and 26 parts of diethylene glycol, 165 parts of a stable solution of the dyestuff are obtained.

A stable concentrated solution is obtained having similar properties when the above dyestuff is replaced by the brownish red 1:2 cobalt complex dyestuff from

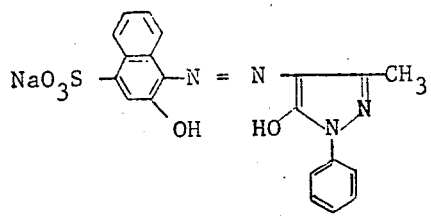

described in French Pat. No. 1,246,903, Example 1.

EXAMPLE 29

A solvent mixture of 21 parts of dimethylformamide, 15 parts of a diacetone alcohol and 64 parts of diethylene glycol is mixed while stirring at 50° to 60° C with 4.5 parts of a dispersant based on dinaphthylmethane disulphonic acid, 0.7 part of a 45% aqueous alkaline solution of an anti-mould agent based on trichlorophenol and 42 parts of the dyestuff C.I. Acid Black 52 one after the other. When all has been added, the mixture is stirred for 2 hours at 50° to 60° c, the heating is then switched off and the mixture stirred for another 3 hours. Any undissolved matter is removed by centrifuge and 130 parts of a stable, rather viscous solution are obtained.

A stable concentrated solution is obtained having similar properties when the above dyestuff is replaced by the black 1:2 chromium complex dyestuff from

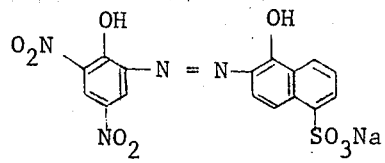

and

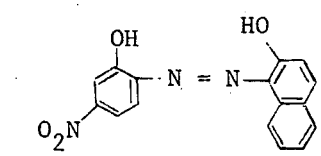

described in French Pat. No. 1,414,067, Example 4 of the table on page 16.

EXAMPLE 30

46 Parts of the brown 1:2-chromium complex dyestuff from

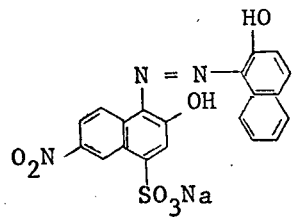

and

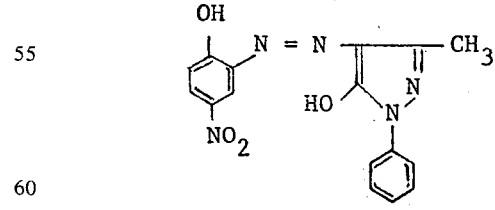

described in French Pat. No. 1,352,623, (Table page 4, No. 2), are introduced at 50° to 60° C, with stirring, into a solvent mixture of 19 parts of tetrahydrofurfuryl alcohol, 81 parts of diethylene glycol and 38 parts of diacetone alcohol; the mixture is stirred for two hours at this temperature; the heating is then switched off and stirring continued for a further three hours. Undissolved substances are afterwards removed by centrifuging to leave 165 parts of a solution stable for a prolonged period of time at −10° to + 60° C.

EXAMPLE 31

If the amount of diethylene gylcol used in Example 30 is replaced by ethylene glycol, then a dyestuff solution having similar properties is obtained.

EXAMPLE 32

In the manner described in Example 30, 70 parts of the same dyestuff are dissolved in a mixture of 30 parts of tetrahydrofurfuryl alcohol and 180 parts of diethylene glycol to obtain 257 parts of a stable solution.

EXAMPLE 33

If the solvent mixture used in Example 32 is replaced by 30 parts of tetrahydrofurfuryl alcohol, 56 parts of diacetone alcohol, 62 parts of ethylene glycol and 62 parts of diethylene glycol, then 255 parts of a stable solution are obtained.

EXAMPLE 34

Very stable dyestuff solutions are obtained if the diethylene glycol used in Example 30 is replaced by triethylene glycol or by 1,2-propylene glycol.

EXAMPLE 35

50 Parts of the dyestuff mentioned in Example 30 are dissolved, by the procedure used in that example, in 21 parts of tetrahydrofurfuryl alcohol, 45 parts of diacetone alcohol and 84 parts of diethylene glycol to give 186 parts of a very stable dyestuff solution.

EXAMPLE 36

If, instead of the solvent mixture mentioned in Example 35, the mixture composed of the following constituents is used, then a dyestuff solution having similar properties is obtained: 69 parts of dyestuff dissolved in 29 parts of tetrahydrofurfuryl alcohol, 62 parts of ethylcellosolve, 58 parts of ethylene glycol and 58 parts of diethylene glycol. Yield after removal of insoluble substances = 251 parts of dyestuff solution.

EXAMPLE 37

69 Parts of the dyestuff used in Example 30 are dissolved by the method described there in 93 parts of diacetone alcohol and 114 parts of diethylene glycol. The undissolved substances are removed to leave 247 parts of a stable and fluid dyestuff paste.

EXAMPLE 38

69 Parts of the dyestuff used in Example 30 are dissolved in 93 parts of ethylcellosolve and 114 parts of diethylene glycol. After removal of the insoluble substances by centrifuging, 247 parts of a stable and fluid dyestuff solution are obtained.

EXAMPLE 39

105 Parts of the olive-green 1:2 -chromium complex dyestuff from

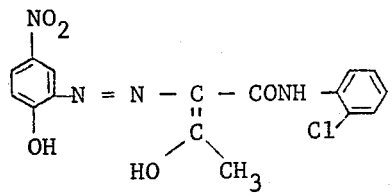

and

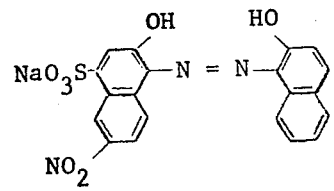

described in French Pat. No. 1,352,623, (Table page 6, No. 13), are introduced at a temperature of 50° to 60° C, with stirring, into a solvent mixture of 56 parts of tetrahydrofurfuryl alcohol, 54 parts of diacetone alcohol, 33 parts of diethylene glycol monoethyl ether and 50 parts of diethylene glycol, together with 1.8 parts of a 45% aqueous-alkaline solution of an anti-mould preparation based on trichlorophenol; stirring is maintained for two hours at this temperature; the heating is then switched off and stirring continued for a further three hours. The undissolved substances are removed by centrifuging to leave 248 parts of a fluid and very stable paste.

EXAMPLE 40

If the amount of diethylene glycol monoethyl ether used in Example 39 is replaced by diethylene glycol, then 249 parts of a fluid paste having practically identical properties are obtained.

EXAMPLE 41

If the solvent mixture used in Example 39 is replaced by 56 parts of tetrahydrofurfuryl alcohol and 137 parts of diethylene glycol, then 251 parts of a very stable and relatively fluid paste are obtained.

EXAMPLE 42

If the amount of diethylene glycol used in Example 40 is replaced by ethylene glycol, then 251 parts of a fluid and stable solution are obtained.

EXAMPLE 43

If the solvent mixture used in Example 39 is replaced by 49 parts of tetrahydrofurfuryl alcohol, 73 parts of diethylene glycol, then 252 parts of a stable and fluid paste are obtained.

EXAMPLE 44

129 Parts of the blue 1:2-chromium complex dyestuff from

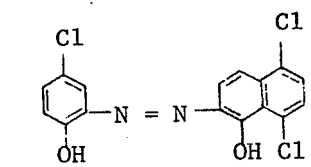

and

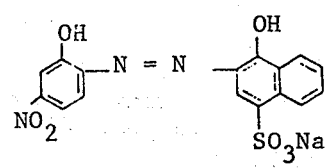

described in French Pat. No. 1,370,510, (Table, page 3, No. 2), are dissolved by the procedure described in Example 39 in 27 parts of tetrahydrofurfuryl alcohol, 54 parts of diacetone alcohol and 90 parts of diethylene glycol. The result is 266 parts of a readily pourable and very storage-stable paste.

EXAMPLE 45

168 Parts of the dyestuff used in Example 44 are dissolved in the manner described in Example 39 is 40 parts of tetrahydrofurfuryl alcohol, 47 parts of diethylene glycol and 143 parts of ethylene glycol, together with 2 parts of a 45% aqueous-alkaline solution of an anti-mould preparation based on trichlorophenol. This yields 366 parts of a readily pourable liquid having very good stability in storage. This liquid can be diluted with 10% of water without losing its good storage properties.

EXAMPLE 46

84 Parts of the brown 1:2-chromium complex dyestuff from

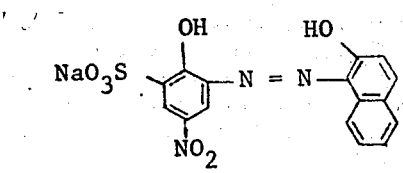

and

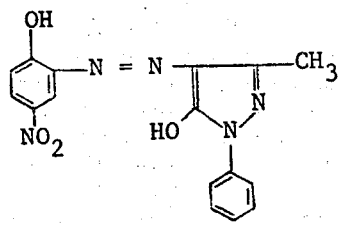

described in French Pat. No. 1,101,955 (Table page 5, No. 4), are dissolved by the procedure described in Example 39 in 30 parts of tetrahydrofurfuryl alcohol, 60 parts of diacetone alcohol and 111 parts of diethylene glycol. The undissolved substances are removed to leave 220 parts of a fluid and stable paste.

EXAMPLE 47

If, instead of the solvent mixture used in Example 46, a mixture of 30 parts of tetrahydrofurfuryl alcohol, 30 parts of dimethylsulphoxide, 30 parts of diacetone alcohol and 111 parts of diethylene glycol is employed, then a paste having similar properties is obtained.

EXAMPLE 48

105 parts of the black mixed chromium complex dyestuff (C.I. 15 711) from

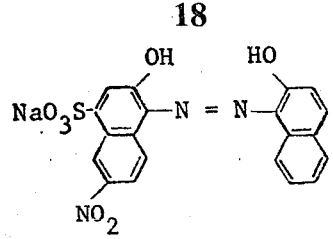

are introduced at 50° to 60° C, with stirring, into a mixture of 40 parts of tetrahydrofurfuryl alcohol, 29 parts of diacetone alcohol, 124 parts of diethylene glycol and 1.8 parts of a 45% aqueous-alkaline solution of an anti-mould preparation based on trichlorophenol; stirring is maintained for two hours at this temperature; the heating is then switched off and stirring continued for three hours. The solid substances are removed by centrifuging to leave 268 parts of a relatively thickly liquid, yet readily pourable paste having excellent stability in storage (between −20° and +60° C).

EXAMPLE 49

If the diethylene glycol in Example 48 is replaced by ethylene glycol, then 282 parts of a paste having similar properties are obtained. This paste retains its excellent storage properties also after dilution with 10% of water.

EXAMPLE 50

140 Parts of the dyestuff used in Example 48 are dissolved by the method used in that example in 54 parts of tetrahydrofurfuryl alcohol, 204 parts of ethylene gylcol and 2 parts of the anti-mould preparation already referred to. This gives 378 parts of a fairly fluid and very storage-stable paste. This paste too can be diluted with 10% of water, without loss of its good storage stability.

EXAMPLE 51

If the ethylene glycol in Example 50 is replaced by diethylene glycol, then 384 parts of a fairly thickly liquid but very easily pourable paste are obtained, which retains its good storage stability also after dilution with 10% of water, with, however, an appreciably lower viscosity.

EXAMPLE 52

If the solvent mixture used in Example 50 is replaced by the following solvent mixture, then a relatively fluid and very storage-stable paste is obtained, which can be very well diluted with 10% of water, without losing its good properties: 54 parts of tetrahydrofurfuryl alcohol, 51 parts of diethylene glycol and 153 parts of ethylene glycol.

EXAMPLE 53

50 parts of the brown 1:2-chromium complex dyestuff from

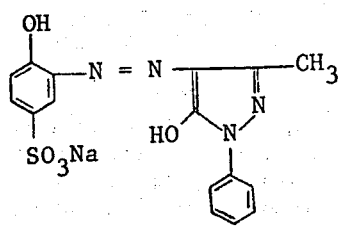

and

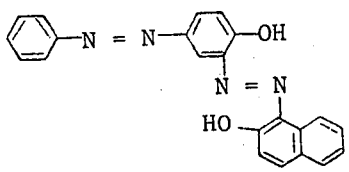

described in U.S. Pat. No. 3,359,253, are dissolved by the usual method in a solvent mixture of 29 parts of diethylene glycol, 14 parts of diacetone alcohol and 7 parts of dimethylformamide. There are thus obtained 77 parts of a stable solution.

EXAMPLE 54

A mixture of 47 parts of the black chromium complex dyestuff from Example 48, 15 parts of the blue dyestuff (C.I. 26 400) of the formula

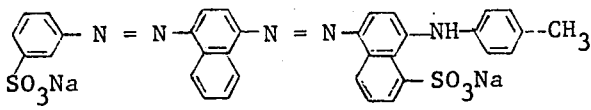

81 parts of the yellow 2:1-cobalt complex dyestuff from

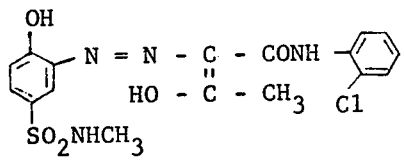

described in U.S. Pat. No. 2,734,895, Example 1, and 53 parts of the orange 2:1-chromium complex dyestuff from

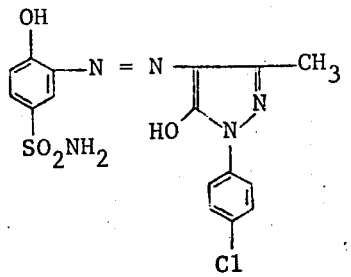

described in U.S. Pat. No. 2,784,179, Example 1, are dissolved by the usual procedure in a solvent mixture of 49 parts of tetrahydrofurfuryl alcohol, 28 parts of diacetone alcohol and 127 parts of diethylene glycol. This gives 350 parts of a very storage-stable liquid.

EXAMPLE 55

85.2 parts of the blue 1:2-chromium complex dyestuff given in Example 44 are added at 50° to 60° C while stirring well to a mixture of solvents consisting of 51.7 parts of dimethyl methylphosphonate and 63.1 parts of diethyleneglycol. The mixture is then stirred for two hours at 50° to 60° C, heating is removed and stirring is continued for 3 more hours. Any undissolved particles are then removed by centrifuging or decanting. 188 parts of a dyestuff solution are obtained which is readily pourable and has excellent storage stability.

I claim:

1. A stable, concentrated substantially anhydrous solution of a metal complex azo dyestuff, wherein the solution contains 10 to 60% by weight of at least one heavy metal complex azo or azomethine dyestuff containing a sulfonic acid group, dissolved in 90 to 40% by weight of at least two water-miscible, organic solvents which are liquid at room temperature, selected from the group consisting of mono or polyalkylene glycol or thioglycol or ether thereof, a hydroxylated ketone, a cyclic ether, a lactam, lactone, dimethyl sulfoxide, sulfolan, sulfolene, hexamethylphosphoric acid triamide, dimethyl methyl phosphonate, N-methylpyrrolidone and a low molecular aliphatic carboxylic acid amide.

2. A solution according to claim 1, wherein 10 to 60% by weight of at least one heavy metal complex azo or azomethine dyestuff containing a sulfonic acid group dissolved in 90 to 40% by weight of at least one water-miscible organic solvent boiling above 80° C selected from the group consisting of mono or polyalkylene gylcol or thioglycol or ether thereof, in admixture with a low molecular aliphatic carboxylic acid amide, a cyclic ether, dimethylsulfoxide, butyrolactone, sulfolan, hexamethylphosphoric acid triamide, dimethyl methyl phosphonate, N-methylpyrrolidone and/or diacetone alcohol.

3. A solution according to claim 2, wherein the organic solvents are selected from the group consisting of mono or polyalkylene gylcol or thioglycol or ether thereof, boiling above 80° C, diacetone alcohol, a cyclic ether, N,N-dimethylacetamide and N,N-dimethylformamide.

4. A solution according to claim 1, wherein the hydroxylated ketone is diacetone alcohol.

5. A solution according to claim 3, wherein the cyclic ether is selected from tetrahydrofuran, tetrahydrofurfuryl alcohol, dioxane, and glycolformal.

6. A solution according to claim 1, wherein the organic solvents are selected from the group consisting of mono or polyalkylene glycol or thioglycol or ether thereof, diacetone alcohol and tetrahydrofurfuryl alcohol.

7. A solution according to claim 2, wherein the organic solvent mixture consists of one or more polyhydric alcohol selected from mono alkylene glycols, poly alkylene glycols, thioglycols and ethers thereof, in admixture with tetrahydrofurfuryl alcohol and/or diacetone alcohol.

8. A solution according to claim 3, wherein the organic solvents are selected from the group consisting of mono or polyalkylene glycol or ether thereof, diacetone alcohol and tetrahydrofurfuryl alcohol.

9. A solution as claimed in claim 1, which contains a 1:1-nickel, 1:1-copper or 1:1-chromium or a 1:2-cobalt or 1:2-chromium complex.

10. A solution as claimed in claim 1, which contains a 1:1-copper or 1:1-chromium complex of an azo dyestuff of the naphthalene azonaphthalene series of a 1:2-cobalt or a 1:2-chromium mixed complex of an azo dyestuff of the naphthaleneazonaphthalene, benzeneazonaphthalene, benzeneazopyrazolone or benzeneazoacetoacetic acid amide series.

11. A solution as claimed in claim 1, which contains a 1:2-cobalt or 1:2-chromium complex of an azo or azomethine dyestuff in which one of the two dyestuff residues in the molecule is a disazo or azo-azomethine dyestuff.

12. A solution as claimed in claim 1, which contains a metal complex of an ortho-carboxy-ortho'-hydroxyazo or of an ortho, ortho'-dihydroxyazo dyestuff.

13. A solution as claimed in claim 1, which contains a 1:2-chromium complex of a monoazo dyestuff in which only one azo dyestuff residue contains a sulphonic acid group.

14. A solution as claimed in claim 1, which contains a 1:2-chromium complex of an ortho, ortho'-dihydroxymonoazo dyestuff of the naphthaleneazonaphthalene, benzeneazonaphthalene, benzeneazopyrazolone or benzenazoacetoacetic acid amide series.

15. A solution as claimed in claim 1, which contains a 1:2-chromium complex of a monoazo dyestuff of which one azo dyestuff residue contains a single sulphonic acid group and each azo dyestuff residue contains at least one nitro group and/or a halogen atom.

16. A solution according to claim 1, wherein, in addition to at least 10% by weight of heavy metal complex azo or azomethine dyestuff containing a sulfonic acid group, said solution contains in admixture therewith at most 50% by weight of at least one azo or azomethine dyestuff.

17. A solution as claimed in claim 1, which also contains at most 5% of a water-immiscible solvent.

18. A solution as claimed in claim 1, which contains a nonionic, anionic or kationic surfactant.

19. A solution as claimed in claim 1, which also contains up to 10% by weight of water.

20. A solution as claimed in claims 1, which also contains a substance that prevents mould formation.

21. A solution as claimed in claim 1, which also contains an anti-foaming agent or a dispersing agent.

22. A solution as claimed in claim 1, which also contains a substance that prevents crystallisation, said substance being selected from the group consisting of urea, thiourea or pentaerythritol.

23. A solution as claimd in claim 1, which contains 10 to 40% by weight of the azo dyestuff complex.

24. A solution as claimed in claim 1, which contains at least 15% by weight of the azo dyestuff complex.

25. A solution as claimed in claim 1, which contains at least 20% by weight of the azo dyestuff complex.

* * * * *

UNITED STATES PATENT OFFICE
CERTIFICATE OF CORRECTION

PATENT NO. : 3,989,452
DATED : November 2, 1976
INVENTOR(S) : PAUL HUGELSHOFER

It is certified that error appears in the above-identified patent and that said Letters Patent are hereby corrected as shown below:

Page 1, under "Assignee" delete "CIBA-GEIGY CORPORATION, Ardsley, New York"

and substitute -- CIBA-GEIGY AG, Basle, Switzerland --.

Column 20, claim 10, line 64, after "series" delete "of"

and substitute -- or --.

Signed and Sealed this

Fifteenth Day of March 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,989,452
DATED : November 2, 1976
INVENTOR(S) : PAUL HUGELSHOFER

It is certified that error appears in the above-identified patent and that said Letters Patent are hereby corrected as shown below:

Page 1 the following was omitted:

-- FOREIGN APPLICATION PRIORITY DATE
July 18, 1969 Switzerland 11076/69
May 14, 1970 Switzerland 7204/70   --.

Signed and Sealed this

Tenth Day of May 1977

[SEAL]

Attest:

RUTH C. MASON
Attesting Officer

C. MARSHALL DANN
Commissioner of Patents and Trademarks